Aug. 26, 1930.  W. C. CROCKATT  1,774,319
MEANS FOR INDICATING THE PRESENCE OF SALINE, ALKALINE,
ACID, OR OTHER IMPURITIES IN WATER AND OTHER FLUIDS
Filed Nov. 10, 1926  2 Sheets-Sheet 2
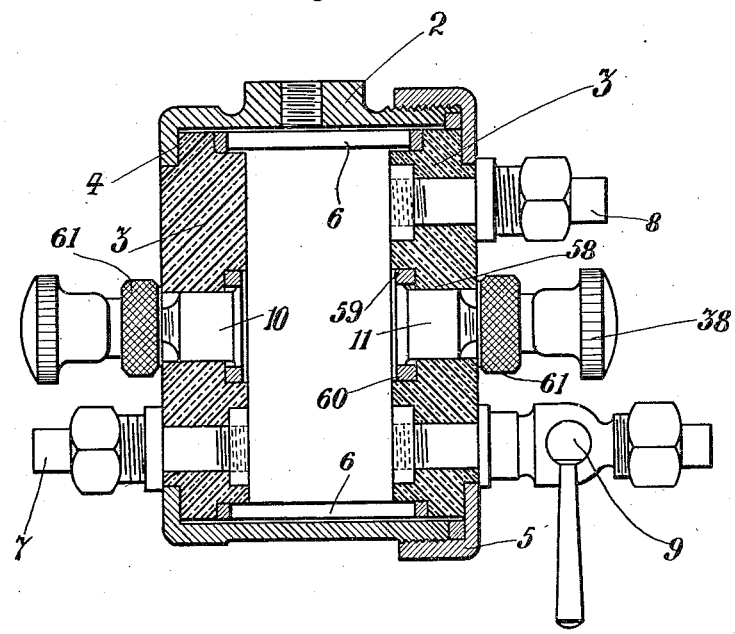
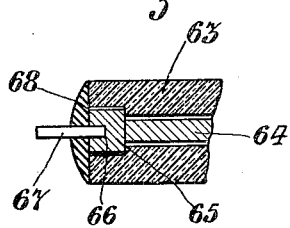
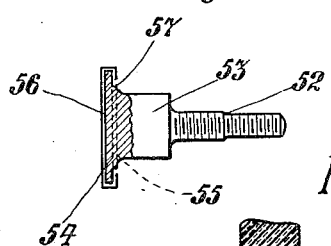
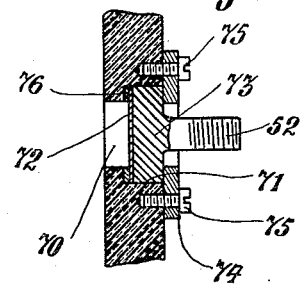

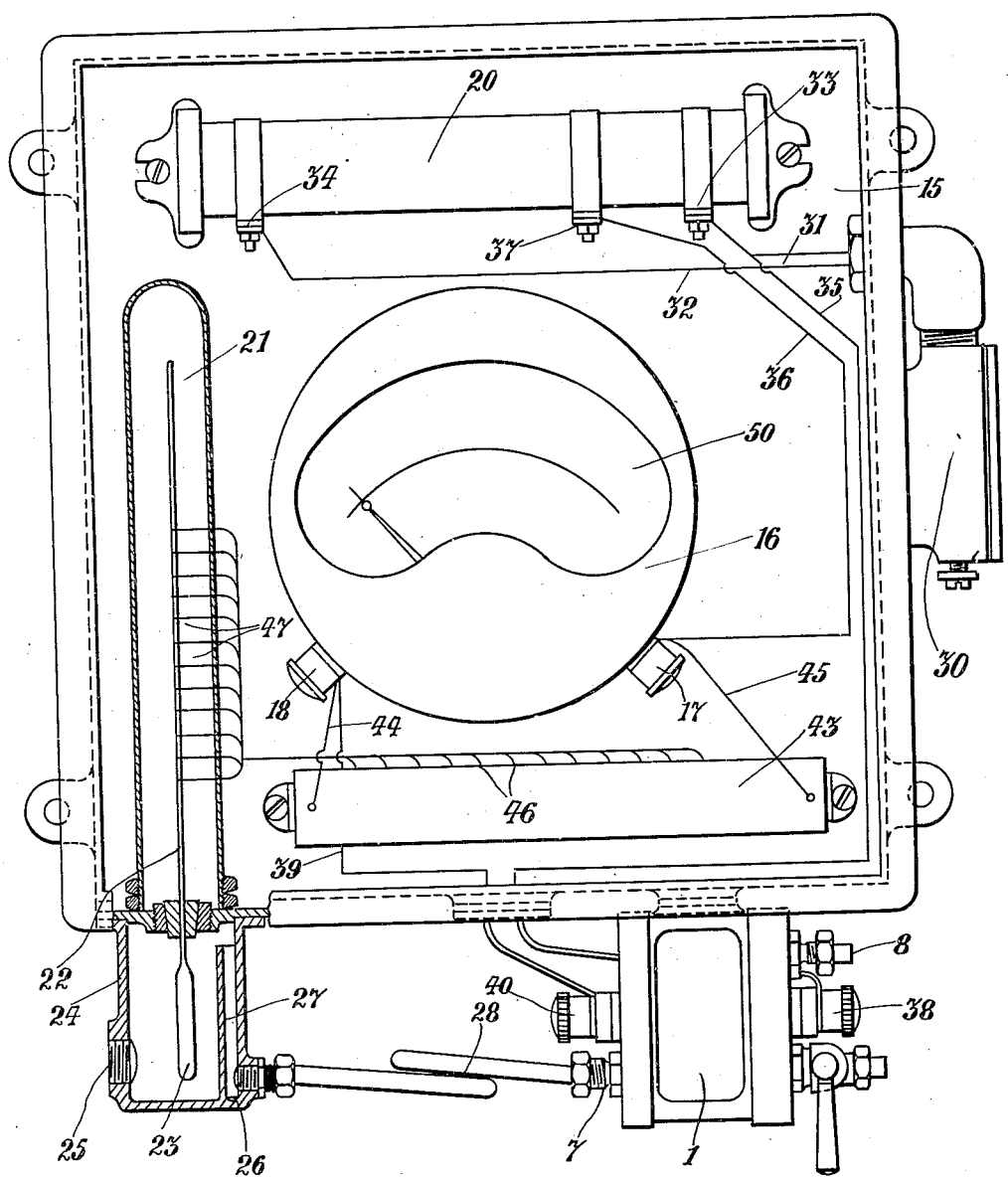

Patented Aug. 26, 1930

1,774,319

UNITED STATES PATENT OFFICE

WILLIAM CAMPBELL CROCKATT, OF GLASGOW, SCOTLAND

MEANS FOR INDICATING THE PRESENCE OF SALINE, ALKALINE, ACID, OR OTHER IMPURITIES IN WATER AND OTHER FLUIDS

Application filed November 10, 1926, Serial No. 147,581, and in Great Britain November 16, 1925.

This invention relates to apparatus for indicating the presence of saline, alkaline, acid and other impurities in water or other fluids and refers to such apparatus of the type which depend for this action upon the variation of electrical conductivity with impurity of the fluid under test, and comprise an electrical circuit having a path for the flow of current through the fluid indicating means in said circuit for indicating the impurity by the variation of the conductivity of the fluid, and means for compensating the indication of said indicating means for change in temperature of the fluid.

The chief object of this invention is to provide improved means for compensating the indication of said indicating means for change in temperature of the fluid. Another object is to provide apparatus of the aforesaid type which will be efficient in operation and which can be marketed as a removable unit which can quickly be fitted up for functioning.

The apparatus may comprise an electrical circuit having electrodes in a member or vessel containing the fluid or through which the fluid passes, means for indicating a change of conductivity in the fluid and a resistance or potentiometer or other means of varying the applied voltage thereof, in the electrical circuit so arranged that the current in the circuit can be or is varied as desired.

In one particular form of apparatus according to this invention designed to allow of variation for different fluids, and to obtain the most appropriate condition for the electrolytic action, a potentiometer is provided in the electrical circuit whereby the amount of current in the circuit can be varied as desired.

In the case of an alternating current a transformer may be substituted for the potentiometer.

Another particular form of apparatus designated to adjust the circuit or indicating means automatically to compensate for variation in temperature of the fluid, consists according to this invention of a device which will be actuated by variation in the temperature of the fluid and so arranged as to act, to vary the resistance in the electrical circuit and thereby effect this compensation.

A device for this purpose may comprise a mercury thermometer having a series of conductors disposed in spaced positions on the stem and extending into the bore of the stem these conductors being connected at spaced points to a shunt regulator for an indicating galvanometer or other instrument in the electrical circuit so arranged that as the mercury rises in the stem on increase of temperature sections of the regulator are successively cut out of circuit thereby automatically compensating the reading of the instrument for any increase of conductivity of the fluid due to the rise in temperature. It will be understood that this thermometer will be located adjacent the electrolytic cell and in the path of the fluid which passes through it.

A salinometer according to this invention is illustrated, by way of example, upon the accompanying drawing wherein:—

Fig. 1 is a face view of the meter with the front cover removed and showing one part in section.

Fig. 2 is a sectional view of the electrolytic cell, drawn to an enlarged scale.

Fig. 3 is a part sectional view of one of the electrodes of the electrolytic cell detached.

Fig. 4 is a sectional view of a modified form of electrode.

Fig. 5 is a fragmental sectional view illustrating a further modified form of electrode.

The meter illustrated comprises an electrolytic cell and an indicator.

The electrolytic cell 1 comprises a cylindrical casing 2 with circular end members 3 of insulating material located in position by the shoulder 4 on one end of the casing, the screwed cap 5 and the spacing device 6, which may conveniently be of glass. An inlet 7 is disposed in one end member and an outlet 8 in the other end member and the latter is disposed at the top of the cell so as to ensure that the cell is always full when in use. A drain cock 9 may also be provided. The electrodes 10 and 11, which will be hereinafter described in detail, are located in the centre of the end members.

The indicator comprises a box-like casing 15 having a detachable side cover with a transparent window (not shown) the electrolytic cell being mounted on the bottom of the said casing. The casing contains the indicating instrument 16 constructed similar to an ammeter but graduated to show directly the proportion of percentage of impurity in the fluid and having terminals 17 and 18; a shunt regulator 43 for the instrument; a potentiometer 20 for the electric circuit and a temperature regulator 21. The temperature regulator 21 comprises a mercury thermometer 22 the bulb 23 of which is disposed in a packet 24 having an inlet 25 and an outlet 26 for the fluid, the outlet being separated from the main part of the pocket by a partition 27 acting as a weir to maintain the pocket substantially full of the fluid when in use. The outlet 26 is connected with the inlet 7 of the electrolytic cell by the pipe 28. A junction box and switch 30 are provided on the side of the casing for the electric supply mains which are connected thereby with the conductors 31—32 which takes the current to the end terminals 33—34 of the potentiometer. The conductors 35—36 are connected across the potentiometer, one to the terminal 33 and the other to the terminal 37, and these conductors constitute the main electrical circuit of this apparatus.

One of these conductors 35 is connected to the terminal 38 of one of the electrodes in the electrolytic cell the other conductor 36 being connected to one terminal of the instrument 16 and through the instrument and conductor 39 to the terminal 40 of the other electrode of the electrolytic cell. The electrolytic cell and instrument are therefore connected in series in the main circuit.

The instrument 16 is provided with a shunt regulator 43 the said regulator being connected across the terminals of the instrument by the conductors 44 and 45. The shunt regulator is provided with a series of tappings indicated at 46 which are connected to a number of conductors 47 disposed in spaced position on the stem of the mercury thermometer 22 and arranged so as to extend into the bore of the stem the arrangement being such that as the mercury rises in the stem sections of the shunt regulator will be cut out of the circuit.

The dial 50 of the instrument 16 will preferably be graduated so as to give directly, the proportion or percentage of saline or other impurities in the fluid.

In operation the fluid to be tested is caused to flow through the electrolytic cell 1 and through the pocket of the temperature regulator and the circuit is switched on, when the proportion or amount of impurity in the fluid is indicated by the instrument 16.

Figs. 3 and 4 illustrate modified forms of electrodes for use in the electrolytic cell. In Fig. 3 the electrode comprises a base portion of inferior metal comprising a shank 52, cylindrical portion 53, a head 54 and a stepped portion 55 between the head and the cylindrical portion. Over the head of this base member is fixed a thin sheet of platinum 56 having its edges 57 spun over the head. This form of electrode is shown in Fig. 2 in which the cylindrical portion extends through a cylindrical hole 58 in the side member of the cell, the head of the electrode fitting in a counter bored recess 59 and a ring of rubber or other compressible packing material 60 is disposed on the stepped portion 55 at the back of the head so as to seal the space between the head and the end member of the cell and prevent the electrolytic cell from getting into contact with the base portion of the electrode. The electrode is clamped in position by the nut 61 mounted on the shank portion 52 and disposed between the head of the electrode and the terminal 38.

In the modified form of electrode shown in Fig. 4 a tube 63 of ebonite is employed having a metallic member 64 passing through the centre thereof. This metallic member is provided with a head 65 having a recess 66 to receive a piece of platinum wire 67 constituting the electrode proper. The wire may be soldered, in position, on the metallic member and vulcanite or other vulcanizable material is then moulded over the end of the ebonite tube at 68 and this is then vulcanized in situ.

In the further modified form of electrode illustrated in Fig. 5 the electrolytic cell is provided with a hole 70 having a concentric recess 71 on its outer surface on which is located a thin sheet of platinum 72 supported by a base 73 of inferior material. The base is clamped in position by the plate 74 and set screws 75, a piece 76 of rubber or other material being disposed between the base of the recess 71 and the platinum sheet to prevent egress of the fluid. The base member is provided with a shank 52 corresponding to that shown in Fig. 3.

I claim:

Apparatus for indicating the presence of impurities in fluid consisting of a removable unit comprising, in combination, a casing, an electric circuit in said casing adapted to receive electric energy from an external source, a cell attached to said casing and through which said fluid passes, two electrodes in said cell coacting with the fluid therein and connected in said circuit, indicating means in said circuit and mounted in said casing, for indicating impurity of the fluid by variation of the current in the circuit, and means for automatically adjusting the indications of said indicating means to compensate for change of temperature of the fluid, comprising, a resistance in shunt with said indicating means, a pocket attached to said casing and through which said fluid passes, a mercury bulb thermometer mounted in said casing with its bulb extending into said pocket and coacting with the fluid therein, a series of tappings from said shunt resistance leading to a series of points in the bore of said thermometer whereby change of level of the mercury in the thermometer bore causes portions of the shunt resistance to be cut out of, or put into, circuit.

In testimony whereof I affix my signature.

WILLIAM CAMPBELL CROCKATT.